United States Patent Office 3,446,589
Patented May 27, 1969

3,446,589
IRON-BASED CATALYSTS, THEIR PREPARATION AND THEIR USES
Roger Botton, Paris, and Andre Steinmetz, Aubervilliers, France, assignors to Produits Chimiques Pechiney-Saint-Gobain, Paris, France
No Drawing. Filed July 19, 1965, Ser. No. 473,240
Claims priority, application France, Feb. 5, 1964, 962,728; Aug. 8, 1964, 985,177; Nov. 26, 1964, 996,414
Int. Cl. C01g *49/08;* C01d *3/04*
U.S. Cl. 23—193
8 Claims

ABSTRACT OF THE DISCLOSURE

Ammonia and chlorine are prepared from ammonium chloride stepwise by reaction under appropriate conditions on the surface of a catalyst containing partly reduced iron oxide, at least one element or its compound having an atomic number from 23 to 30, and an alkali metal chloride, preferably KCl. The catalyst is oxidized during the reactions and is partly reduced before reuse.

---

This invention relates to iron based catalysts, their preparation and their uses. Such catalysts are of importance in the manufacture of chlorine and ammonia from ammonium chloride and the invention will be described in connection with that use. It is to be understood, however, that this particular description does not constitute a limitation.

Catalytic processes for dissociating ammonium chloride are known in which the essential catalytic elements include a metallic oxide, usually iron oxide, associated with an alkali metal salt from among which potassium chloride is commonly used. Before using such catalysts it is customary to reduce the metallic oxide partially, a process which is conveniently carried out at elevated temperatures in the presence of a reducing gas such as hydrogen. This catalyst is put in contact with ammonium chloride under appropriate conditions of temperature and pressure, ammonia is liberated and chlorine is fixed on the catalyst. The catalyst mass can then be treated with an oxidizing gas, for instance oxygen, which releases the chlorine for recovery. The catalytic mass is then suitable for use in another such operation. Such methods were valuable but had not yet been brought to their highest efficiency.

It is an object of this invention to improve the efficiency of catalytic processes of dissociating ammonium chloride and the like, and especially to prepare a novel catalyst, the use of which produces superior results.

It is among the objects of the invention to provide a novel method of making such catalysts and a novel method of using such catalysts.

The objects of the invention are accomplished generally speaking by a catalyst complex consisting in its essential elements of an iron oxide compound, an element having an atomic number from 23 to 30 inclusive, and an alkali metal salt.

The iron oxide compound in this complex is preferably highly oxidized, the oxide $Fe_3O_4$ being particularly useful. The elements of atomic number from 23 to 30 may appear elementally or as compounds, and among the alkali metal compounds all have been used at one time or another but potassium chloride is usually employed.

Among the other metallic elements, compounds of manganese, zinc, vanadium, and chromium are preferred either in their metallic states or, preferably, as oxides or chlorides. These metallic elements are included in the catalyst mass so as to produce an atomic ratio to the iron present between 2% and 25%. The compositions of manganese, especially $Mn_3O_4$ and its salts, are especially valuable when the atomic ratio of manganese to iron lies between about 7 and 11%. When these metallic elements are introduced in elemental form they tend to be transformed to oxides or chlorides, when employed in processes utilizing oxidation and chlorination reactions such as the preparation of ammonia and chlorine from ammonium chloride.

When potassium chloride is used in the complex, it is employed in such proportions that the molar ratio to ferric chloride (which is formed during the intermediate stage of the process) after fixation of the chlorine is between about 0.7 and 2.5 as outer limits and preferably between about 1.1 and 1.7.

The catalyst mass may include a solid inert filler such as silica. It may also include an activator such as one or more of the rare earth metals.

The several elements of the new catalyst may be mingled in any known way, for example by mixing the finely divided solids, and this may be done either before they are mingled with the ammonium chloride or during the actual dissociation. It is especially useful to impregnate solid inert diluents with solutions of these elements. For instance one may impregnate solid inert diluents such as finely divided silica with solutions of iron and other metallic elements, dry the mass and mix it with the remaining constituents. It is also possible to prepare the catalytic mass by preparing an aqueous iron oxide bath, mixing it with the particles of filler, depositing the oxide thereon and then adding the other components as more fully described in my prior application Ser. No. 429,901. Inasmuch as the invention of that case is useful in this process, this case is a continuation in part as to all common subject matter and is entitled to the benefit of the foreign filing date of that case.

In carrying out the process the catalytic mass is heated between 500° and 550° C. and a current of reducing gas such as carbon oxide, hydrogen, or illuminating gas is passed through it until the metallic oxides are partially reduced.

The ammonium chloride is then brought into contact with the catalyst at a temperature between 350° and 550° C., usually near 420° C. and the ammonia liberated is carried off, usually by passing an inert gas through the mass. Inert gases such as nitrogen, and reducing gases such as carbon oxide are useful for this purpose. During this operation the chloride ion of ammonium chloride is fixed in the catalyst. When the liberation of ammonia ends, an oxidizing gas, usually gas containing oxygen, is passed through the mass, a temperature rise follows due to the oxidation of metallic chlorides and nonchlorinated, reduced metallic oxides. The chlorine is then liberated at a temperature between 480° and 550° C. usually near 500°–520° C. The partially dechlorinated catalyst mass is then reactivated by a reducing gas, as aforesaid, and used again.

These novel catalyst masses can be used in any convenient way for example in fixed baths, in mobile masses, or in fluidized masses. The new catalytic masses have substantially higher efficiency than those of the prior art, particularly in that they liberate the elemental chlorine faster during the oxidation of the chlorinated mass. Furthermore, they produce a gas having a higher content in chlorine and substantially free from hydrochloric acid.

With respect to the prior art compositions the novel catalysts release chlorine more rapily and more completely, producing an effluent higher in chlorine, which contain less HCl than the comparable effluent gases of the prior art. The yields of ammonia are above 98% of the quantity appearing as ammonium chloride in the raw material.

The following examples illustrate the invention:

EXAMPLE 1

150 parts by weight of ferriferous bauxite containing 37.7% of iron were calcined at 60° C. The calcined product was mixed with 18 parts by weight of potassium chloride and 8 parts by weight of $Mn_3O_4$. This mass was penetrated by a current of hydrogen at 500° C. and cooled. The activated mass was put in contact with 24.2 parts by weight of ammonium chloride. The temperature was raised to 400–410° C. Ammonia was liberated and carried off by a current of nitrogen. After the release of the ammonia the catalyst mass, containing the chlorine, was heated to 500°–510° C. in a current of oxygen and the chlorine released was recovered. During this step the chlorine from the ammonium chloride had been fixed in a catalyst mass, presumably forming metallic chlorides. This partially chlorinated catalyst was reduced by hydrogen gas and recycled for use with another charge of 24.2 parts by weight of ammonium chloride. Such recycling may continue indefinitely.

99% of the ammonia in the ammonium chloride was recovered and in the next step four successive fractions of the effluent gas containing chlorine were analyzed as indicated in tests 1–4 of Table I.

For purposes of comparison an identical process was carried out except that the catalyst mass omitted the manganese. The recovery is indicated in Fractions T1, T2, T3. It will be perceived that there is a great improvement in the percent of chlorine recovered, that HCl is low or absent in the recovered gas, and that the yield is greatly improved. The sum of the three first fractions showed 83.2% dechlorination compared to only 44.8% for the comparative tests.

TABLE I

| No. of the fraction | Percent of chlorine in the gas | Percent of HCl in the gas | Yield in $Cl_2$ based on the Cl in $NH_4Cl$ |
|---|---|---|---|
| 1 | 88.6 | 0.6 | 52.1 |
| 2 | 64 | 0 | 24.2 |
| 3 | 27.9 | 0 | 6.9 |
| 4 | 11 | 0 | 2.3 |
| T1 | 57.4 | 6.2 | 19.7 |
| T2 | 45.2 | 2.6 | 13.5 |
| T3 | 39.9 | 1.9 | 11.6 |

EXAMPLE 2

Operating under the same general conditions as Example 1 with 150 parts by weight of ferriferous bauxite duly calcined, containing 50.7 parts of iron, 18 parts of potassium chloride, 16.4 parts of zinc oxide, and 25 parts of ammonium chloride. 98% of ammonia was recovered from the ammonium chloride and analysis of the fractions was as follows:

TABLE II

| No. of the fraction | Percent of chlorine in the gas | Percent of HCl in the gas | Yield in $Cl_2$ based on the Cl in $NH_4Cl$ |
|---|---|---|---|
| 1 | 90.4 | 4.70 | 58.40 |
| 2 | 62.60 | 1.10 | 24.10 |

EXAMPLE 3

100 parts of corundum in particles between 20 and 60 microns in a flask, containing about 1000 parts of water, received with agitation 80 parts of metallic iron and 60 parts of ferrous sulphate heptahydrate. This was in sufflated with air at 12 to 14 volumes per hour, the proper ratio being determinable by considering the parts as grams and volumes as liters. The mass was heated at 70°–75° C. Iron oxide was formed and deposited on the corundum. After 38 hours of reaction a reaction mass was covered, washed and calcined at 650° C. to a 20% content of metallic iron. 3.9 parts of $Mn_3O_4$ was admixed and then 9 parts of potassium chloride.

With the catalytic mass thus prepared the disintegration of ammonium chloride was carried out as in Example 1 using 12 parts of ammonium chloride. The recovery of ammonium was 98.75% and the fractions of chlorine analyzed as follows:

TABLE III

| No. of the fraction | Percent of chlorine in the gas | Percent of HCl in the gas | Yield in $Cl_2$ based on the Cl in $NH_4Cl$ |
|---|---|---|---|
| 1 | 88.9 | 6.2 | 54.8 |
| 2 | 51.8 | 0.9 | 17.4 |

Example 4

A catalyst mass was prepared by calcining 150 parts of ferriferous bauxite containing 33.8% of metallic iron, the product being mixed with 18 parts of potassium chloride, 4 parts of $Mn_3O_4$ and 5 parts of copper chloride. The catalyst mass was mixed with 25 parts of ammonium chloride and the procedure was as in Example 1. In the course of the second operation 98.35% of the ammonia was recovered and the following was the constitution of the gases from the oxidation of the chlorinated catalyst:

TABLE IV

| No. of the fraction | Percent of chlorine in the gas | Percent of HCl in the gas | Yield in $Cl_2$ based on the Cl in $NH_4Cl$ |
|---|---|---|---|
| 1 | 79.1 | 2.7 | 39.4 |
| 2 | 74.1 | 2.4 | 33.5 |

The substantial advantages of the invention are the greater overall efficiency of the process, the more speedy and more complete release of the chlorine from the chlorinated catalyst, the low percentage of HCl in the recovered gas, and the yield of chlorine with respect to that present in ammonium chloride.

These catalyst masses are useful not only with ammonium chloride but in the pyrolytic decomposition of ammonium bromide and other ammonium halides and in the decomposition of metallic halides where such are capable of such decomposition. The processes of preparing the catalysts are simple, novel and effective. The ingredients of the catalyst can be assembled, intermixed and stored until time of use, activation being accomplished just prior to the first step of the process in which the catalyst is to be used, or activation may be followed by storage and use. In the disintegration of ammonium chloride it is preferred to accomplish partial reduction just prior to use.

As many apparently widely different embodiments of the present invention may be made without departing from the spirit and scope thereof, it is to be understood that the invention is not limited to the specific embodiments.

What is claimed is:

1. A catalyst complex consisting essentially of partially reduced iron oxide having a composition approximating $Fe_3O_4$, potassium chloride in which the molecular ratio of KCl to the iron oxide computed as $FeCl_3$ is between 0.7 and 2.5, and a material selected from the group consisting of the metals, oxides, and chlorides of manganese and zinc in which the atomic ratio of manganese or zinc to iron is between 2 and 25%.

2. Catalyst complex as described in claim 1 in which the said material is in the form of its oxide.

3. A catalyst complex as described in claim 1 in which the said material is in the form of its chloride.

4. A catalyst according to claim 3 in which said material is present as $Mn_3O_4$ in the ratio Mn:Fe=7–11%.

5. A process for preparing ammonia and chlorine from ammonium chloride which comprises contacting ammonium chloride at its decomposition temperature with a catalyst complex consisting essentially of an iron oxide, potassium chloride in which the molecular ratio of KCl to the iron oxide computed as $FeCl_3$ is between 0.7 and 2.5, and a material selected from the group consisting of the metals, oxides and chlorides of manganese and zinc in which the atomic ratio of manganese or zinc to iron is between 2 and 25%, said catalyst having been reduced to a more active state by partial reduction with a hot reducing gas, fixing the chlorine in the catalyst mass, recovering the ammonia released by said decomposition temperature, contacting the catalyst mass containing the fixed chlorine from the ammonium chloride decomposition with an oxidizing agent at a temperature of about 480–520° C. to liberate chlorine, recovering the liberated chlorine, subjecting the catalyst mass to heating at elevated temperature in the presence of a reducing gas to reduce partially the iron oxide to a more active form, and repeating the recited process steps.

6. The process according to claim 5 in which said material is in the form of its oxide.

7. The process according to claim 5 in which said material is in the form of its chloride.

8. The process according to claim 5 is in which the material also contains a copper compound selected from the group consisting of the oxides and chlorides.

References Cited

UNITED STATES PATENTS

| | | |
|---|---|---|
| 379,488 | 1/1868 | Mond _____ 23—193 |
| 2,476,920 | 7/1949 | Segura _____ 252—474 |
| 2,542,464 | 2/1951 | Black et al. _____ 252—441 |
| 2,729,664 | 1/1956 | Kirshenbaum _____ 252—474 |

FOREIGN PATENTS

| | | |
|---|---|---|
| 14,001 | 7/1888 | Great Britain. |
| 15,649 | 8/1890 | Great Britain. |

OSCAR R. VERTIZ, *Primary Examiner.*

H. S. MILLER, *Assistant Examiner.*

U.S. Cl. X.R.

252—441, 467, 474, 476